US011078342B2

(12) United States Patent
Cuder et al.

(10) Patent No.: US 11,078,342 B2
(45) Date of Patent: Aug. 3, 2021

(54) BLOCK EXPANDABLE POLYMERIC COMPOSITIONS

(71) Applicant: Versalis S.p.A., San Donato Milanese (IT)

(72) Inventors: Giovanni Cuder, Mantova (IT); Stefano Comba, Bagnolo Piemonte (IT)

(73) Assignee: Versalis S.P.A., San Donato Milanese (IT)

( * ) Notice: Subject to any disclaimer, the term of this patent is extended or adjusted under 35 U.S.C. 154(b) by 51 days.

(21) Appl. No.: 16/314,098

(22) PCT Filed: Jul. 28, 2017

(86) PCT No.: PCT/EP2017/069166
§ 371 (c)(1),
(2) Date: Dec. 28, 2018

(87) PCT Pub. No.: WO2018/019995
PCT Pub. Date: Feb. 1, 2018

(65) Prior Publication Data
US 2019/0309138 A1 Oct. 10, 2019

(30) Foreign Application Priority Data
Jul. 29, 2016 (IT) .................. 102016000080035

(51) Int. Cl.
| C08J 9/14 | (2006.01) |
| C08J 9/16 | (2006.01) |
| C08J 9/232 | (2006.01) |
| C08J 9/00 | (2006.01) |
| C08L 25/06 | (2006.01) |
| C08J 9/224 | (2006.01) |
| C09D 125/06 | (2006.01) |

(52) U.S. Cl.
CPC .............. *C08J 9/141* (2013.01); *C08J 9/0061* (2013.01); *C08J 9/16* (2013.01); *C08J 9/224* (2013.01); *C08J 9/232* (2013.01); *C08L 25/06* (2013.01); *C09D 125/06* (2013.01); *C08J 2201/03* (2013.01); *C08J 2201/036* (2013.01); *C08J 2203/14* (2013.01); *C08J 2207/00* (2013.01); *C08J 2325/06* (2013.01); *C08J 2453/02* (2013.01)

(58) Field of Classification Search
CPC ... C08J 9/0061; C08J 9/141; C08J 9/16; C08J 9/224; C08J 9/232; C08J 2201/03; C08J 2201/036; C08J 2203/14; C08J 2207/00; C08J 2325/06; C08J 2453/02; C08L 25/06; C09D 125/06
See application file for complete search history.

(56) References Cited

U.S. PATENT DOCUMENTS

| 3,595,942 A | 7/1971 | Wald et al. |
| 3,810,957 A | 5/1974 | Lunk |
| 2010/0143697 A1 | 6/2010 | Schips et al. |
| 2011/0065819 A1 | 3/2011 | Schips et al. |
| 2011/0268972 A1 | 11/2011 | Schips et al. |
| 2011/0269858 A1 | 11/2011 | Schips et al. |
| 2013/0140728 A1 | 6/2013 | Schips et al. |

FOREIGN PATENT DOCUMENTS

| CA | 149002 A | | 7/1913 |
| CA | 2148992 A1 | | 11/1995 |
| DE | 19710442 B4 | | 2/2008 |
| JP | 03-182529 | * | 1/1991 |
| JP | H04 89846 A | | 3/1992 |
| JP | H06 49256 A | | 2/1994 |
| JP | 2007084744 A | | 4/2007 |
| JP | 2012097190 A | | 5/2012 |
| WO | WO 03053650 A1 | | 7/2003 |

OTHER PUBLICATIONS

Tuftec, Asahi Kasei Corporation, Apr. 2016.*
International Search Report and Written Opinion for PCT/EP2017/069166, dated Sep. 13, 2017, 14 pages.
Office Action in Japanese patent application 2018-557000, dated Jun. 22, 2021, 4 pages. English summary provided.

* cited by examiner

*Primary Examiner* — Irina S Zemel
(74) *Attorney, Agent, or Firm* — Praedcere Law

(57) ABSTRACT

The present invention relates to an expandable polymeric composition that comprises: a) from 60% to 88% by weight of a vinyl aromatic polymer and/or copolymer, calculated respect to (a)+(b); b) from 12% to 40% by weight of a block copolymer, containing at least one vinyl aromatic polymer and/or copolymer and at least one hydrogenated diene polymer, calculated respect to (a)+(b); c) from 3 parts to 10 parts by weight of a blowing agent, calculated on 100 parts of (a)+(b).

25 Claims, 1 Drawing Sheet

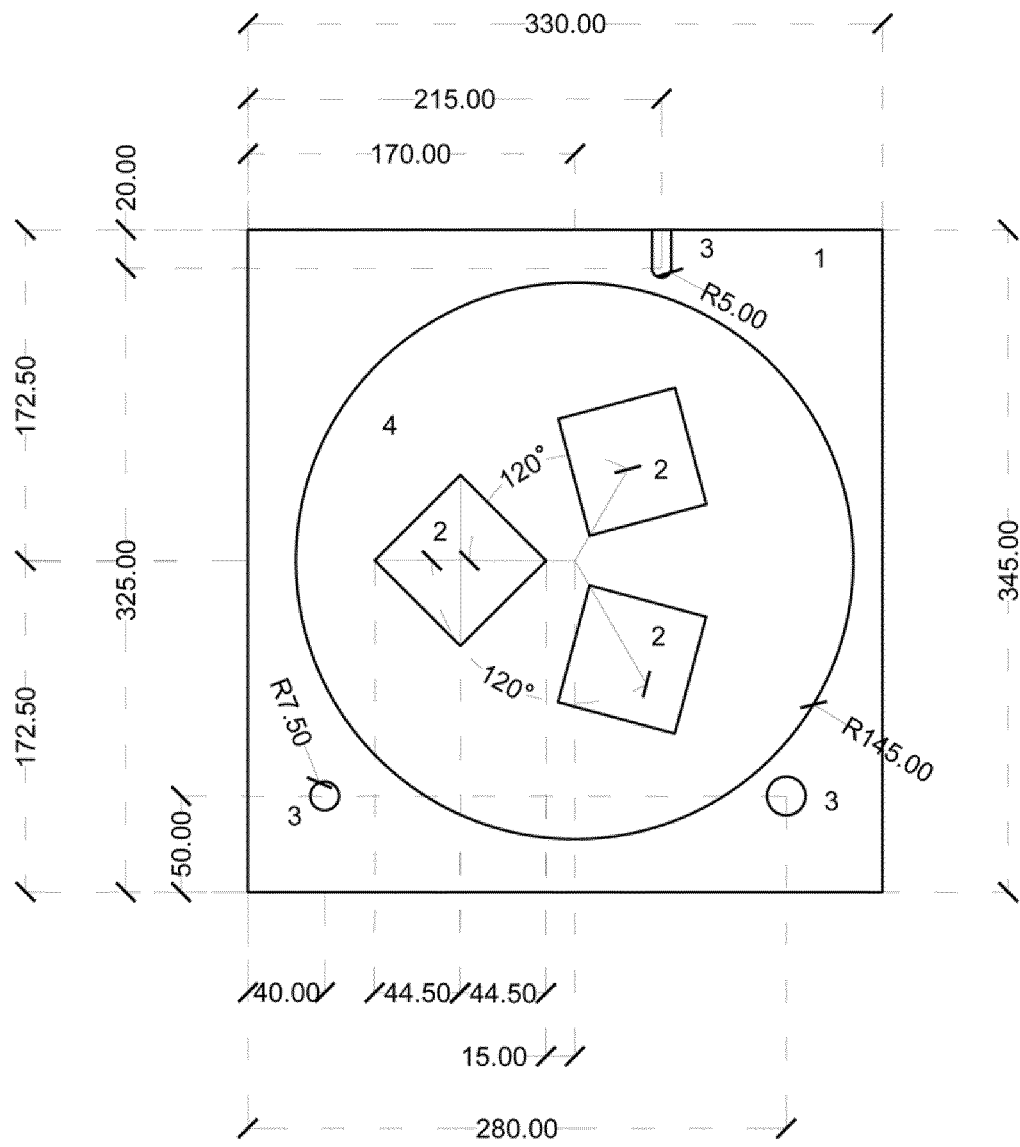

BLOCK EXPANDABLE POLYMERIC COMPOSITIONS

The present invention relates to expandable polymeric compositions containing vinyl aromatic-elastomer saturated block copolymers, and a preparation process thereof. In particular, the present invention relates to expandable polymeric compositions containing vinyl aromatic polymers and/or copolymers, and block copolymers that comprise vinyl aromatic polymer blocks and completely saturated elastomer polymer blocks.

The present invention also relates to polymer foams in the shape of granules that contain the compositions described and claimed in the present patent application. Said compositions have reduced abrasive power and improved resistance to impact therefore they can be used for the production of packaging. Hence, the present invention also relates to packaging that contains the compositions described and claimed; and the use of said compositions for the manufacturing of packaging.

In the present patent application, all the operating conditions included in the text must be considered as preferred conditions even if this is not specifically stated.

For the purpose of this text the term "comprise" or "include" also comprises the term "consist in" or "essentially consisting of".

For the purpose of this text the definitions of the intervals always comprise the extremes unless specified otherwise.

For the purpose of the present description, all the compositions as described and claimed are included wherein the percentages of the individual components are chosen so that their sum is always less than or equal to 100%.

Packaging obtained from expandable polystyrene still constitutes a large majority of the components intended for protecting the packaged goods against impacts. However, foams based on polystyrene, as such are closed cell foams and are notoriously stiff. The intrinsic stiffness of the material means that the surface of the packaging has, according to the density and degree of sintering of the expanded beads, either the tendency to scratch the packaged surfaces (which must be protected with polyethylene coatings or similar) or the tendency to peel due to lack of adhesion of the beads. Furthermore, the reduced elasticity of the foam allows it to absorb impact better when the loads per unit of surface area (defined as the ratio between the weight of the packaged item with the contact surface) are greater than 5 kPa, which may be significant for goods such as TVs, electronic or mobile equipment. Normally, this problem is overcome by reducing the "active" surface of the shock absorbing packaging, shaping it with relevant ribs, which however give the packaging complex shapes and undercuts that can be made only through the molding of individual pieces. Alternatively to foams containing polystyrene, polyolefin-based foams can be used (expanded polyethylene and polypropylene) which, although having good tribological and dynamic cushioning properties, are characterized by high diffusivity of the blowing agents and cannot therefore be transported in the expandable phase (with apparent densities>500 kg/m$^3$) but only in the already expanded form and therefore with lower efficiency in terms of transport costs.

CA 2148992 describes an expandable composition that can be used for producing elastic foams. Said composition comprises from 50% to 90% by weight of a styrenic polymer; from 5% to 30% by weight of at least one styrene-soluble elastomer, e.g. polybutadiene, preferably in the form of particles; from 5% to 20% by weight of at least one block copolymer containing styrene and an unsaturated olefin monomer such as styrene-butadiene, styrene-isoprene or mixtures thereof, preferably in the form of particles that have an average size that ranges from 0.2 to 2 µm; from 1% to 15% by weight of a low boiling point blowing agent, calculated on the total composition. CA 149002 describes expandable compositions that comprise from 50% to 75% by weight of a styrene polymer; from 5% to 30% by weight of a styrene-soluble elastomer; from 5% to 20% by weight of at least one block copolymer containing styrene and an unsaturated olefin monomer such as styrene-butadiene, styrene-isoprene or mixtures thereof; from 15% to 50% by weight of at least one polyolefin; from 1% to 15% by weight of a low boiling point blowing agent.

DE 19710442 relates to polymers that are used for preparing resilient foams. In particular, a block copolymer is described having an SB/S–(S)n structure wherein SB indicates the styrene-butadiene copolymer and S is a styrene block contained in a quantity comprised from 5 to 40% by volume. The distribution of the monomers is casual (random or statistical); n is 0 or 1. The polymers also comprise 50% to 95% by weight of styrenic polymer.

US 2013/0140728 and US 2010/143697 describe expandable thermoplastic compositions that comprise from 45% to 98.9% by weight of a styrene polymer; from 1% to 45% by weight of a polyolefin, for example an ethylene-vinyl acetate copolymer, from 0.1% to 10% by weight of a hydrogenated or non-hydrogenated styrene-butadiene block copolymer; and a blowing agent. Compositions thus formed allow the loss of blowing agent to be reduced; they have a high capacity to expand and allow granules to be prepared that have high rigidity and at the same time good elasticity.

US 2011/0065819 describes expandable polymer beads of thermoplastic material that comprise from 45% to 97.8% by weight of a styrene polymer; from 1 to 45% by weight of a polyolefin, for example an ethylene-vinyl acetate copolymer, which has a melting point that ranges from 105° C. to 140° C.; from 0% to 25% by weight of a polyolefin whose melting point is less than 105° C.; from 0.1% to 25% by weight of a styrene-butadiene block copolymer; from 0.1% to 10% by weight of a styrene-ethylene-butadiene block copolymer; from 1% to 15% by weight of a blowing agent.

The polymer beads thus formed allow the loss of blowing agent to be reduced, have a high capacity to expand and can be processed in granules that have high rigidity and at the same time good elasticity.

US 2011/268972 describes expandable polymer beads of thermoplastic material that comprise from 45% to 89.5% by weight of a styrene polymer; from 5% to 20% by weight of a polyolefin, for example an ethylene-vinyl acetate copolymer, with a melting point that ranges from 105° C. to 140° C.; from 1% to 15% by weight of a polyolefin that has a melting point less than 105° C.; from 3% to 25% by weight of a styrene-butadiene or styrene-isoprene block copolymer; from 0.5 to 5% by weight of a styrene-ethylene-butylene block copolymer; from 1% to 15% by weight of a blowing agent, and possibly up to 5% by weight of a nucleating agent. In total the sum of the block copolymers containing styrene ranges from 3.5% to 30% by weight.

The beads thus formed determine a reduced loss of blowing agent, a high capacity to expand and can be processed in granules that have high rigidity and at the same time good elasticity.

Usually, the expandable compositions known in the state of the art, containing vinyl aromatic and elastomeric polymers, intended for packaging, are obtained with expensive polymer materials or processes that require special storage and transport conditions, or must be transformed shortly after the impregnation of a blowing agent. The Applicant has found that dispersions containing block copolymers, wherein the blocks have a vinyl aromatic component and a completely saturated elastomeric component, allow to obtain expandable compositions that are easy to prepare, in which the blowing agent maintains its concentration over time.

An object of the present patent application relates to an expandable polymeric composition that comprises:
a) from 60% to 88% by weight of a vinyl aromatic polymer and/or copolymer, calculated respect to (a)+(b);
b) from 12% to 40% by weight of a block copolymer, containing at least one vinyl aromatic polymer and/or copolymer and at least one hydrogenated diene polymer, calculated respect to (a)+(b);
c) from 3 parts to 10 parts by weight of a blowing agent, calculated on 100 parts of (a)+(b).

The polymeric compositions described and claimed in the present patent application have reduced abrasive power and improved resistance to impact therefore they can be used for the production of packaging.

The packaging thus obtained has excellent dynamic cushioning, does not scratch the surfaces of the packaged goods and does not break up during use, maintaining the adhesion of the sintered expanded beads between each other and having a maximum displacement over 30 mm (according to standard ISO 1209).

Therefore, further object of the present invention is related to the use of said compositions for the manufacturing of packaging and packaging that contains said compositions described and claimed.

To be able to manufacture the packaging described and claimed, it is necessary to transform the polymeric compositions covered by the present patent application into polymeric foams in the form of granules. Said foams also constitute further object of the present patent application.

Said foams can be used for obtaining packaging materials where the improved elastic properties of the foam lead to an advantage in terms of the absorption of impacts and surface quality. In fact, the presence of the elastomer allows the packaging to absorb impact better at low loads (i.e. low weight/surface area ratio) and to be deformed through bending, recovering the original shape and especially reducing the abrasive power against the packaged surfaces.

The packaging obtained can afford dynamic cushioning, are flexible, pleasant to touch and has reduced abrasive power. The expanded beads that form the packaging adhere well to each other and do not detach during use. Furthermore, the blowing agent, contained in the composition, does not migrate outside the beads during storage at atmospheric pressure and at the usual temperature for expandable vinyl aromatic polymers.

These technical benefits also represent an economic advantage as they allow packaging to be produced with larger contact surfaces, obtaining it by cutting large volume blocks, rather than having to obtain it by molding shaped pieces, a technique that typically requires a more expensive process, which is less efficient in terms of production capacity and less flexible in production. In fact, it typically requires molds dedicated to a single series of products. In addition, the possibility to deform the foam is a characteristic that cannot be obtained with the expanded styrene polymers known in the state of the art. To these, the improved tribological characteristic is added, which preserves the surfaces, particularly glossy ones, of packaged goods.

The compositions described and claimed are particularly competitive compared to the expanded polyolefins used in the applications already mentioned, because being expandable they allow cost savings during the transport step in which they are not yet expanded.

With respect to other expandable flexibilized foams with polyolefins of the state of the art, the compositions described and claimed exhibit better stability of the blowing agent with direct consequences on the processability of the product and on the expansion step (lower reachable density), and indirect consequences on the less stringent storage methods. In fact, the products of the state of the art are transported in expensive sealed metal drums and stored in refrigerating cells to delay the separation of the blowing agent that is able to generate highly flammable and/or explosive atmospheres. Finally, further object of the present patent application is a process for preparing said expandable compositions.

DETAILED DESCRIPTION

The Applicant now describes in detail the polymeric compositions according to the present patent application.

The present invention relates to a polymeric composition comprising:
a) from 60% to 88% by weight of a vinyl aromatic polymer and/or copolymer, calculated respect to (a)+(b);
b) from 12% to 40% by weight of a block copolymer, containing at least one vinyl aromatic polymer and/or copolymer and at least one hydrogenated diene polymer, calculated respect to (a)+(b);
c) from 3 parts to 10 parts by weight of a blowing agent, calculated on 100 parts of (a)+(b).

Preferably the polymeric compositions described and claimed comprise:
a) from 60% to 88% by weight of a vinyl aromatic polymer and/or copolymer, calculated with respect to (a)+(b);
b) from 12% to 40% by weight of a block copolymer, containing at least one vinyl aromatic polymer and/or copolymer and at least one hydrogenated diene copolymer; calculated with respect to (a)+(b);
c) from 3 parts to 10 parts by weight of a blowing agent, calculated on 100 parts of (a)+(b).

Vinyl aromatic monomers that can be used for preparing the vinyl aromatic polymer and/or copolymer, used in the compositions described and claimed herein, have general formula (I):

In formula (I), R is a hydrogen or a methyl group; n is zero or an integer that ranges from 1 to 3; Y is chosen from a halogen, preferably chlorine or bromine; a chloromethyl; an alkyl group or an alkoxy group having from 1 to 3 carbon atoms.

Preferred vinyl aromatic monomers having formula (I) are chosen from styrene, α-methylstyrene, methylstyrene, ethylstyrene, vinyltoluene isomers, ethylstyrene isomers, propylstyrene isomers, chlorostyrene isomers, methylchlorostyrene isomers, methoxystyrene isomers, acetoxystyrene isomers, hydroxystyrene isomers, methylhydroxystyrene isomers and mixtures thereof. More preferably, said vinyl aromatic monomers can be chosen from styrene and α-methylstyrene.

Vinyl aromatic monomers having general formula (I) can be used alone, mixed together or in mixtures up to 35% by weight with other copolymerizable vinyl monomers. Preferred copolymerizable vinyl monomers are chosen from (meth)acrylic acid, maleic anhydride, alkyl esters of (meth)acrylic acid having 1 to 18 carbon atoms, amides and nitriles of (meth)acrylic acid. Among said esters of (meth)acrylic acid, compounds chosen from ethylacrylate, methylmethacrylate, butylacrylate, 2-ethylhexylacrylate, dodecylacrylate, dodecylmethacrylate, stearyl acrylate, stearyl methacrylate, glycidyl methacrylate, ethylene glycol dimethacrylate, and mixtures thereof, are preferred. Among said nitriles of (meth)acrylic acid, preferred are compounds chosen from acrylamide, methacrylamide, dimethylaminoethylmethacrylate, acrylonitrile, methacrylonitrile, butadiene, ethylene and divinylbenzene.

The weight average molecular weight MW of the polymer and/or copolymer (a) is comprised between 130 kDa and 250 kDa. MWs lower than 130 kDa confer too high fluidity, which causes the beads collapse during the expansion process. MWs greater than 250 kDa confer an insufficient expansion speed and an inappropriate final density of the expanded product.

The block copolymer (b) may contain at least one, preferably at least two, vinyl aromatic polymer blocks, and at least one hydrogenated diene polymer block. Preferred block copolymers are the polystyrene-poly(ethylene-butylene)-polystyrene (SEBS) type, derived from the hydrogenation of the polystyrene-polybutadiene-polystyrene block copolymer; block copolymers of the polystyrene-poly(ethylene-propylene)-polystyrene (SEPS) type, derived from the hydrogenation of the polystyrene-polyisoprene-polystyrene block copolymer. SEBS block copolymers are preferred.

Conjugated dienes that can be used for preparing block copolymers (b) are those having from 4 to 8 carbon atoms in the molecule; preferably they are selected from 1,3-butadiene, isoprene, 2,3-dimethyl-1,3-butadiene, piperylene, and mixtures thereof; 1,3-butadiene is particularly preferred.

Linear block copolymers are treated for totally hydrogenating the rubbery portion of the copolymer. The hydrogenation can be performed in the presence of any known hydrogenation catalyst, such as nickel/Kieselguhr or Runey nickel copper chromate. The hydrogenation process followed is described for example in U.S. Pat. Nos. 3,595,942 and 3,810,957. The hydrogenation conditions are critical and any temperature and pressure can be used. These products are on the market with the name EUROPRENE SOL TH 2311, EUROPRENE SOL TH 2312, manufactured and sold by the company Versalis S.p.A.

In the block copolymer the vinyl aromatic component content may be comprised between 20% and 45% by weight, more preferably between 25% and 32% by weight, with respect to the weight of the block copolymer. The Melt Flow Index (MFI) of the vinyl aromatic component in the block copolymer may be greater than or equal to 1 g/10 min (measured with ASTM D1238 method; 5 kg, 200° C.).

Every blowing agent able to be incorporated into the vinyl aromatic polymer and/or copolymer (a) can be used in the compositions described and claimed. Preferably, the blowing agent is a liquid substance with a boiling point, at atmospheric pressure, comprised between 10° C. and 80° C., more preferably comprised between 20° C. and 60° C. The blowing agent may be contained in quantities that range from 3 parts to 10 parts, preferably from 3 parts to 7 parts, calculated on 100 parts of component (a) added to component (b).

Preferred blowing agents are selected from aliphatic or cycloaliphatic hydrocarbons containing from 3 to 6 carbon atoms and the halogenated derivatives of aliphatic hydrocarbons containing from 1 to 3 carbon atoms. Preferred aliphatic or cycloaliphatic hydrocarbons containing from 3 to 6 carbon atoms are the blowing agents selected from n-pentane, iso-pentane, cyclo-pentane, butane, iso-butane and mixtures thereof. Preferred halogenated derivatives of aliphatic hydrocarbons containing from 1 to 3 carbon atoms include blowing agents selected from dichlorodifluoromethane, 1,2,2-trifluoroethane and 1,1,2-trifluoroethane, carbon dioxide.

Preferably in the compositions described and claimed, there is from 65% to 85% by weight of a vinyl aromatic polymer and/or copolymer, calculated with respect to (a)+(b); and from 15% to 35% by weight of a block copolymer, containing at least one vinyl aromatic polymer and/or copolymer and at least one hydrogenated diene polymer; calculated with respect to (a)+(b).

More preferably in the compositions described and claimed, there is from 70% to 82% by weight of a vinyl aromatic polymer and/or copolymer, calculated with respect to (a)+(b); and from 18% to 30% by weight of a block copolymer, containing at least one vinyl aromatic polymer and/or copolymer and at least one hydrogenated diene polymer; calculated with respect to (a)+(b).

The polymeric compositions according to the present patent application can be prepared with a continuous or discontinuous process, by mixing in the molten state components (a) and (b) and adding (c) directly in extrusion or subsequently in aqueous suspension. Continuous technology is preferred.

Therefore, further subject matter of the present patent application is a continuous mass process for preparing the compositions described and claimed that comprises the following steps in sequence:
i) if the polymer and/or copolymer (a) is in granules
   1. heating said polymer and/or copolymer to a temperature above its melting point together with a block copolymer (b), so as to form a polymeric composition in the molten state;
   2. then incorporating a blowing agent into said polymeric composition in the molten state;
ii) if the polymer and/or copolymer (a) is already in molten state, adding a copolymer (b) and then incorporating a blowing agent so as to form a polymeric composition.

All the known expansion techniques are applicable, for example expansion with steam or that with hot air.

The expandable compositions described and claimed herein after expansion form expanded or molded foams.

Below are some examples for better understanding the invention and within the scope of application, although not constituting in any way a limitation to the scope of the present invention.

Comparative Example: 100% GPPS Composition 100 parts of EDISTIR N1782 (produced by Versalis s.p.a, since January 2016 marketed as N3782), are fed into a single-screw extruder that feeds, with a residence time of 7 minutes, at 260 bar and about 190° C., a static mixer, at the inlet to which 5.5 parts of n-pentane (75%) and iso-pentane (25%) mixture are added. The mixture thus obtained is distributed onto holes with 0.5 mm diameter, immediately cooled with a water jet and cut with a series of rotating knives according to the technology described in patent application WO 03053650, which is incorporated herein in full for reference purposes. The pressure in the granulation chamber is 5 bar and the cutting shear is determined to obtain granules of average diameter 1.2 mm. Water is sprayed as a cooling liquid and nitrogen is used as a carrier gas for the beads, which are then dried with a centrifugal dryer. Once dried, they are fed into a continuous screw mixer with 3 parts of glycerol monostearate, one part of zinc stearate and 0.2 parts of glycerin per 1000 parts of granules. A part of these granules is stored in a cardboard drum (capacity 20 kg) in a closed environment at a temperature of 25°±2° C. to assess the weight loss of the blowing agent; a month after processing 5.3% of residual pentane is found, and after three months 4.3% residual. The remaining granules thus obtained are pre-expanded with steam at 100° C., left to rest for one day and used for forming parallelepipeds in compliance with ISO 4651, ISO 1209 tests and internal tests to determine the abrasive power.

Example 1: Composition with 88% of GPPS and 12% of SEBS 88 parts of EDISTIR N1782 (manufactured by Versalis s.p.a, since January 2016 marketed as N3782), GPPS with MW of 180 kDa, and 12 parts of EUROPRENE SOLTH 2311 (manufactured by Versalis s.p.a), wherein the percentage of styrene is 30%, are fed into a single-screw extruder that feeds, with a residence time of 7 minutes, at 260 bar and about 190° C., a static mixer, at the inlet to which 5.5 parts of n-pentane (75%) and iso-pentane (25%) mixture are added. The mixture thus obtained is distributed onto holes with 0.5 mm diameter, immediately cooled with a water jet and cut with a series of rotating knives according to the technology described in patent application WO 03053650, incorporated herein in full. The pressure in the granulation chamber is 5 bar and the cutting shear is determined so as to obtain beads of average diameter 1.2 mm. Water is sprayed as a cooling liquid and nitrogen is used as a carrier gas for the granules. The granules are then dried with a centrifugal dryer and fed into a continuous screw mixer with 3 parts of glycerol monostearate, one part of zinc stearate and 0.2 parts of glycerin per 1000 parts of granules. A part of these granules is stored in a cardboard drum (capacity 20 kg) in a closed environment at a temperature of 25°±2° C. to assess the weight loss of the blowing agent; a month after processing 5.2% of residual pentane is found, and after three months 4.3% residual. The remaining granules thus obtained are pre-expanded with steam at 100° C., left to rest for one day and used for forming parallelepipeds in compliance with ISO 4651, ISO 1209 tests and internal tests to determine the abrasive power.

Example 2: Composition with 85% of GPPS and 15% of SEBS 85 parts of EDISTIR N1782 (manufactured by Versalis s.p.a, since January 2016 marketed as N3782), GPPS with MW of 180 kDa, and 15 parts of EUROPRENE SOLTH 2311, wherein the percentage of styrene is 30%, are fed into a single-screw extruder that feeds, with a residence time of 7 minutes, at 260 bar and about 190° C., a static mixer, at the inlet to which 5.5 parts of n-pentane (75%) and iso-pentane (25%) mixture are added. The mixture thus obtained is distributed onto holes with 0.5 mm diameter, immediately cooled with a water jet and cut with a series of rotating knives according to the technology described in patent application WO 03053650, incorporated herein in full. The pressure in the granulation chamber is 5 bar and the cutting shear is determined so as to obtain beads of average diameter 1.2 mm. Water is sprayed as a cooling liquid and nitrogen is used as a carrier gas for the granules. The granules are then dried with a centrifugal dryer and fed into a continuous screw mixer with 3 parts of glycerol monostearate, one part of zinc stearate and 0.2 parts of glycerin per 1000 parts of granules. A part of these granules is stored in a cardboard drum (capacity 20 kg) in a closed environment at a temperature of 25°±2° C. to assess the weight loss of the blowing agent; a month after processing 5.1% of residual pentane is found, and after three months 4.2% residual. The remaining granules thus obtained are pre-expanded with steam at 100° C., left to rest for one day and used for forming parallelepipeds in compliance with ISO 4651, ISO 1209 tests and internal tests to determine the abrasive power.

Example 3: Composition with 80% of GPPS and 20% of SEBS 80 parts of EDISTIR N1782 (manufactured by Versalis s.p.a, since January 2016 marketed as N3782), GPPS with MW of 180 kDa, and 20 parts of EUROPRENE SOLTH 2311, wherein the percentage of styrene is 30%, are fed into a single-screw extruder that feeds, with a residence time of 7 minutes, at 260 bar and about 190° C., a static mixer, at the inlet to which 5.5 parts of n-pentane (75%) and iso-pentane (25%) mixture are added. The mixture thus obtained is distributed onto holes with 0.5 mm diameter, immediately cooled with a water jet and cut with a series of rotating knives according to the technology described in patent application WO 03053650, incorporated herein in full. The pressure in the granulation chamber is 5 bar and the cutting shear is determined so as to obtain beads of average diameter 1.2 mm. Water is sprayed as a cooling liquid and nitrogen is used as a carrier gas for the granules, which are then dried with a centrifugal dryer and added in a continuous screw mixer, with 3 parts of glycerol monostearate, one part of zinc stearate and 0.2 parts of glycerin per 1000 parts of granules. A part of these granules is stored in a cardboard drum (capacity 20 kg) in a closed environment at a temperature of 25°±2° C. to assess the weight loss of the blowing agent; a month after processing 5.1% of residual pentane is found, and after three months 4% residual. The remaining granules thus obtained are pre-expanded with steam at 100° C., left to rest for one day and used for forming parallelepipeds in compliance with ISO 4651, ISO 1209 tests and internal tests to determine the abrasive power.

Experimental Dynamic Cushioning Performance Tests According to ISO 4651.

According to standard ISO 4651, the compositions prepared in EXAMPLES 1-3, having the same density of 22 g/liter, were subjected to dynamic cushioning performance tests. Table 1 shows the maximum deceleration values expressed in multiples of the acceleration due to gravity (g in m/s$^2$) as a function of the applied pressure (P in kPa), wherein the ratio of the falling height of the dart to the sample thickness is 15. Table 2 shows the data for the second impact.

The values of Table 1 and Table 2 for the compositions prepared in EXAMPLES 1-3 are very similar. Furthermore, for the second impact the compositions prepared in EXAMPLES 1-3 have better values with respect to the composition prepared in the COMPARATIVE EXAMPLE.

Therefore the advantage of maintaining a low deceleration value translates into better dynamic cushioning performance by the foam, preserving the packaged goods more effectively with respect to the comparative example.

TABLE 1 first impact

| | Minimum of deceleration (*g) | Pressure at the Minimum of deceleration (kPa) |
|---|---|---|
| COMPARATIVE EXAMPLE | 35 | 10 |
| EXAMPLE 1 | 35.9 | 7.2 |
| EXAMPLE 2 | 35.7 | 6.7 |
| EXAMPLE 3 | 36 | 7.5 |

TABLE 2 second impact

| | Minimum of deceleration (*g) | Pressure at the Minimum of deceleration (kPa) |
|---|---|---|
| COMPARATIVE EXAMPLE | 51 | 6.2 |
| EXAMPLE 1 | 46.5 | 4.8 |
| EXAMPLE 2 | 47.1 | 4.6 |
| EXAMPLE 3 | 47.4 | 4.6 |

Experimental Bending Tests ISO 1209

According to standard ISO 1209, the compositions prepared in EXAMPLES 1-3, having the same density of 22 g/liter, were subjected to the bending test. Table 3 shows the maximum stress values (P in kPa) reached before the sample breaks and the relative maximum displacement (mm).

Table 3 shows that the compositions obtained in EXAMPLES 1-3 perform fairly well in terms of the maximum stress resistance obtained with respect to the compositions of the COMPARATIVE EXAMPLE, but with distinctly higher displacements. Furthermore, the composition obtained in EXAMPLE 3 is surprisingly deformable. These values indicate that the material obtained has higher bending deformation, largely exceeding the displacement values intrinsic to the material obtained in the comparative example.

The greater deformability implies lower bending breakage.

TABLE 3

| | Maximum stress (kPa) | Maximum displacement (mm) |
|---|---|---|
| COMPARATIVE EXAMPLE | 250* | 10* |
| EXAMPLE 1 | 223 | 30 |
| EXAMPLE 2 | 212 | 32 |
| EXAMPLE 3 | 210 | 41 |

*best result on 5 density tests of 20 g/l

Method for Determining the Abrasive Power

This part of the text presents the abrasive power measurements performed with the compositions prepared in examples 1 to 3 and in the comparative example. The measurements were taken using a method that is illustrated below.

The method for calculating the abrasive power of the expanded products envisages cylindrical samples of expanded material, with a diameter of 290 mm and thickness of 50 mm, being arranged on rotating equipment as described in FIG. 1. This method is based on the phenomenon of the sliding of a panel of expanded material on a compact homopolymer polystyrene sample (representative of the packaged material). Three plaques (60×60 mm) are arranged on each panel of expanded material, equally spaced out from one another and with respect to the center of rotation. The panel is fixed onto a rotary plate, so as to create relative motion.

FIG. 1 shows the system used for measuring the abrasive power. In FIG. 1:

1 is the supporting mount for the compact homopolymer polystyrene plaques fasten to the fixed basis of the instrument, 2 are the compact homopolymer polystyrene plaques with a thickness of 3.2 mm, 3 are the fastening elements of the mount 1

4 is the cylinder of expanded composition, fasten to the rotor, in contact with the compact homopolymer plaques.

Therefore, the plaques are fixed, whereas the rotation is only applied to the panel of EPS. The test conditions are the following:

1. A load centered on each individual plaque of 0.4 kg in order to replicate the equivalent pressure (=0.1 kg/cm$^2$) that an item of furniture exerts on the packaging;
2. Rotation speed $\omega$=125 rpm;
3. Wearing time t=60 sec.

The damage caused by the abrasion is evaluated with optical analysis of the "Haze" and "Clarity" on the compact homopolymer polystyrene plaques. "Haze" is the part of incident light diffused at angles over 2.5°, whereas "Clarity" is the part of incident light diffused at angles less than 2.5°.

The analyzed size is reduced from 25 mm of diameter to 10 mm in order to select the most consistent damage caused by the matrix. The expanded compositions have the same density, sintered beads size and flat contact surface with the plaques. This allows exerting uniform and repeatable damages on the plaques.

The presence of fragments of expanded composition indicates reduced adhesion of the expanded beads between one another or breakage thereof during the abrasion test. Table 4 shows the results of the abrasion tests in terms of "Haze", "Clarity" and presence of fragments.

TABLE 4

| Sample | Haze | Clarity | Fragments |
|---|---|---|---|
| COMPARATIVE EXAMPLE | 10 | 75 | Yes |
| EXAMPLE 1 | 9.0 | 90 | No |
| EXAMPLE 2 | 7.3 | 89.5 | No |
| EXAMPLE 3 | 7.7 | 95.2 | No |

Table 4 shows how as the SEBS content increases, the damage value decreases, particularly in comparison with the COMPARATIVE EXAMPLE.

The invention claimed is:

1. An expandable polymeric composition comprising:
   a. from 60% to 88% by weight of a vinyl aromatic polymer and/or vinyl aromatic copolymer, calculated with respect to (a)+(b);
   b. from 12% to 40% by weight of a block copolymer, containing at least one vinyl aromatic polymer and/or vinyl aromatic copolymer and at least one hydrogenated diene polymer, calculated with respect to (a)+(b);
   c. from 3 parts to 10 parts by weight of a blowing agent, calculated on 100 parts of (a)+(b);

wherein all of the polymer and/or (co)polymer of the composition consists of components a) and b);

wherein the vinyl aromatic polymer and/or vinyl aromatic copolymer (a) is obtained from a vinyl aromatic monomer of formula (I):

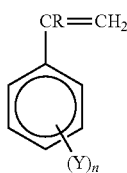

(I)

alone, or from a mixture of said vinyl aromatic monomers of formula (I), or from a mixture containing said vinyl aromatic monomers of formula (I) and copolymerizable vinyl monomers; in which R is a hydrogen or a methyl group; n is zero or an integer that ranges from 1 to 3; Y is selected from a halogen; a chloromethyl; an alkyl group or an alkoxy group having from 1 to 3 carbon atoms;

wherein said copolymerizable vinyl monomers are selected from (meth)acrylic acid, maleic anhydride, alkyl esters of (meth)acrylic acid having 1 to 18 carbon atoms, or amides and nitriles of (meth)acrylic acid.

2. Polymeric composition according to claim 1 consisting of elements a), b) and c).

3. Polymeric composition according to claim 1, wherein the block copolymer is a styrene-ethylene-butylene-styrene.

4. Polymeric composition according to claim 1 wherein the vinyl aromatic monomer is selected from styrene, α-methylstyrene, methyl-styrene, ethyl-styrene, vinyltoluene isomers, ethylstyrene isomers, propylstyrene isomers, chloro styrene isomers, methylchlorostyrene isomers, methoxystyrene isomers, acetoxystyrene isomers, hydroxystyrene isomers, methylhydroxystyrene isomers, and mixtures thereof.

5. Polymeric composition according to claim 1 wherein the block copolymers are selected from polystyrene-poly (ethylene-butylene)-polystyrene or block copolymers of polystyrene poly(ethylene-propylene)-polystyrene type.

6. Polymeric composition according to claim 1 wherein conjugated dienes used for the preparation of block copolymers (b) are those having from 4 to 8 carbon atoms.

7. Polymeric composition according to claim 6 wherein the conjugated dienes are selected from 1,3-butadiene, isoprene, 2,3-dimethyl-1,3-butadiene, piperylene, and mixtures thereof.

8. Polymeric composition according to claim 1 in which a vinyl aromatic component content in the block copolymer (b) ranges from 20% to 45% by weight.

9. Polymeric composition according to claim 1, wherein the Melt Flow Index (MFI) of the vinyl aromatic copolymer in the block copolymer is greater than or equal to 1 g/10 min, measured with ASTM D1238 method; 5 kg, 200° C.

10. Polymeric composition according to claim 1 wherein the blowing agent is selected from aliphatic or cycloaliphatic hydrocarbons containing from 3 to 6 carbon atoms and the halogenated derivatives of aliphatic hydrocarbons containing from 1 to 3 carbon atoms.

11. Expanded beads which contain the polymeric composition according to claim 1.

12. Packaging comprising the beads according to claim 11.

13. Packaging comprising the polymeric composition according to claim 1.

14. Polymeric composition according to claim 2, wherein the block copolymer is a styrene-ethylene-butylene-styrene.

15. Polymeric composition according to claim 2 wherein the block copolymers are selected from polystyrene-poly (ethylene-butylene)-polystyrene or block copolymers of polystyrene poly(ethylene-propylene)-polystyrene type.

16. Polymeric composition according to claim 2 wherein conjugated dienes used for the preparation of block copolymers (b) are those having from 4 to 8 carbon atoms.

17. Polymeric composition according to claim 16 wherein the conjugated dienes are selected from 1,3-butadiene, isoprene, 2,3-dimethyl-1,3-butadiene, piperylene, and mixtures thereof.

18. Polymeric composition according to claim 2 in which the vinyl aromatic copolymer content in the block copolymer (b) ranges from 20% to 45% by weight.

19. Polymeric composition according to claim 2, wherein the Melt Flow Index (MFI) of the vinyl aromatic copolymer in the block copolymer is greater than or equal to 1 g/10 min, measured with ASTM D1238 method; 5 kg, 200° C.

20. Polymeric composition according to claim 2 wherein the blowing agent is selected from aliphatic or cycloaliphatic hydrocarbons containing from 3 to 6 carbon atoms and the halogenated derivatives of aliphatic hydrocarbons containing from 1 to 3 carbon atoms.

21. Expanded beads which contain the polymeric composition according to claim 2.

22. Packaging comprising the beads according to claim 21.

23. Packaging comprising the polymeric composition according to claim 2.

24. Polymeric composition according to claim 1 comprising from 18% to 30% by weight of said block copolymer, containing said at least one vinyl aromatic polymer and/or vinyl aromatic copolymer and said at least one hydrogenated diene polymer, calculated with respect to (a)+(b).

25. Polymeric composition according to claim 1 consisting essentially of elements (a), (b) and (c).

* * * * *